United States Patent [19]

Cound et al.

[11] Patent Number: 4,459,906
[45] Date of Patent: Jul. 17, 1984

[54] AEROSOL CAN EVACUATOR AND COMPACTOR

[75] Inventors: Cary D. Cound, La Puente; Joseph A. Vivona, Santa Ana, both of Calif.

[73] Assignee: American Home Products Corp., New York, N.Y.

[21] Appl. No.: 445,340

[22] Filed: Nov. 29, 1982

[51] Int. Cl.³ ............................................. B30B 15/30
[52] U.S. Cl. .................................... 100/45; 100/49; 100/98 R; 100/116; 100/215; 100/295; 100/902; 222/87
[58] Field of Search ............... 100/39, 98 R, 45, 215, 100/49, 116, 902, 98 A, 295; 222/87

[56] References Cited

U.S. PATENT DOCUMENTS

| 2,139,143 | 12/1938 | Wiswell | 100/902 X |
| 3,695,172 | 10/1972 | Cleary | 100/45 |
| 3,777,659 | 12/1973 | McCarten | 100/902 X |
| 3,835,768 | 9/1974 | Kidson | 100/902 X |
| 3,889,587 | 6/1975 | Wharton | 100/902 X |
| 3,993,221 | 11/1976 | Boynton | 100/902 X |
| 4,091,725 | 5/1978 | Arp | 100/45 |
| 4,126,160 | 11/1978 | Gurtler | 100/902 X |
| 4,133,261 | 1/1979 | Belfils | 100/902 X |
| 4,333,395 | 6/1982 | Kurtz | 100/902 X |
| 4,333,396 | 6/1982 | Longnecker | 100/902 X |
| 4,333,397 | 6/1982 | Modes | 100/902 X |
| 4,345,518 | 8/1982 | Cash | 100/902 X |
| 4,345,519 | 8/1982 | Sabino | 100/902 X |
| 4,345,520 | 8/1982 | Goldsmith | 100/902 X |
| 4,349,054 | 9/1982 | Chipman | 222/87 X |

FOREIGN PATENT DOCUMENTS

| 20040 | 12/1980 | European Pat. Off. | 100/902 |
| 2841015 | 4/1980 | Fed. Rep. of Germany | 100/98 R |

Primary Examiner—Billy J. Wilhite
Attorney, Agent, or Firm—Joseph M. Weigman

[57] ABSTRACT

Apparatus is provided for evacuating and compacting filled aerosol cans. The cans are manually placed into a feed chute and sensing means are provided to confirm proper can orientation and to permit gravity feed of the can into a crushing mechanism. A hydraulic ram pushes the can against a stator plate. A punch reciprocates through an opening in the stator plate puncturing the bottom of the can so that the contents discharge into a receiver where the liquid contents are separated from the propellent and recovered. An air logic means controls the sequencing of the operative steps. The apparatus can be used in an explosive area.

2 Claims, 9 Drawing Figures

AEROSOL CAN EVACUATOR AND COMPACTOR

This invention relates generally to can crushing devices. More particularly, the invention relates to an apparatus for simultaneously recovering the liquid contents of aerosol pressurized containers and compacting the containers themselves.

The disposal of rejected aerosol-filled containers at the filling plant is a problem. Many propellants are explosive and therefore the recovery operation must be carried out in an explosion-proof area. Explosion-proof apparatus, or apparatus for use in explosive areas, is much more expensive than apparatus where an explosion hazard is not present.

Also, the contents of the rejected containers are frequently sufficiently valuable to be recoverable at a profit. Also, it may be desirable for the aerosol propellant to be separated from the contents and recovered.

The emptying of rejected aerosol containers has generally been a labor-intensive operation where a great deal of manual effort is required. There is an element of hazard to the operators.

It is an object of the present invention to provide an improved apparatus for disposing of filled aerosol containers.

It is a further object of the present invention to provide an apparatus for recovery of the liquid contents of rejected aerosol containers.

It is another object of this invention to provide a separation and compaction apparatus which may be operated in an explosive area.

It is a still further object of the present invention to provide an automated apparatus requiring a minimum of labor for the disposal of aerosol-filled containers.

Other and further objects of the invention will be apparent from reading the description in conjunction with the drawings in which:

FIG. 3 is a cross-sectional view of the feeder and crusher taken generally along lines 3—3 of FIG. 1;

FIG. 4 is a cross-sectional view of the crusher chamber taken generally along line 4—4 of FIG. 1.

Figure 1:
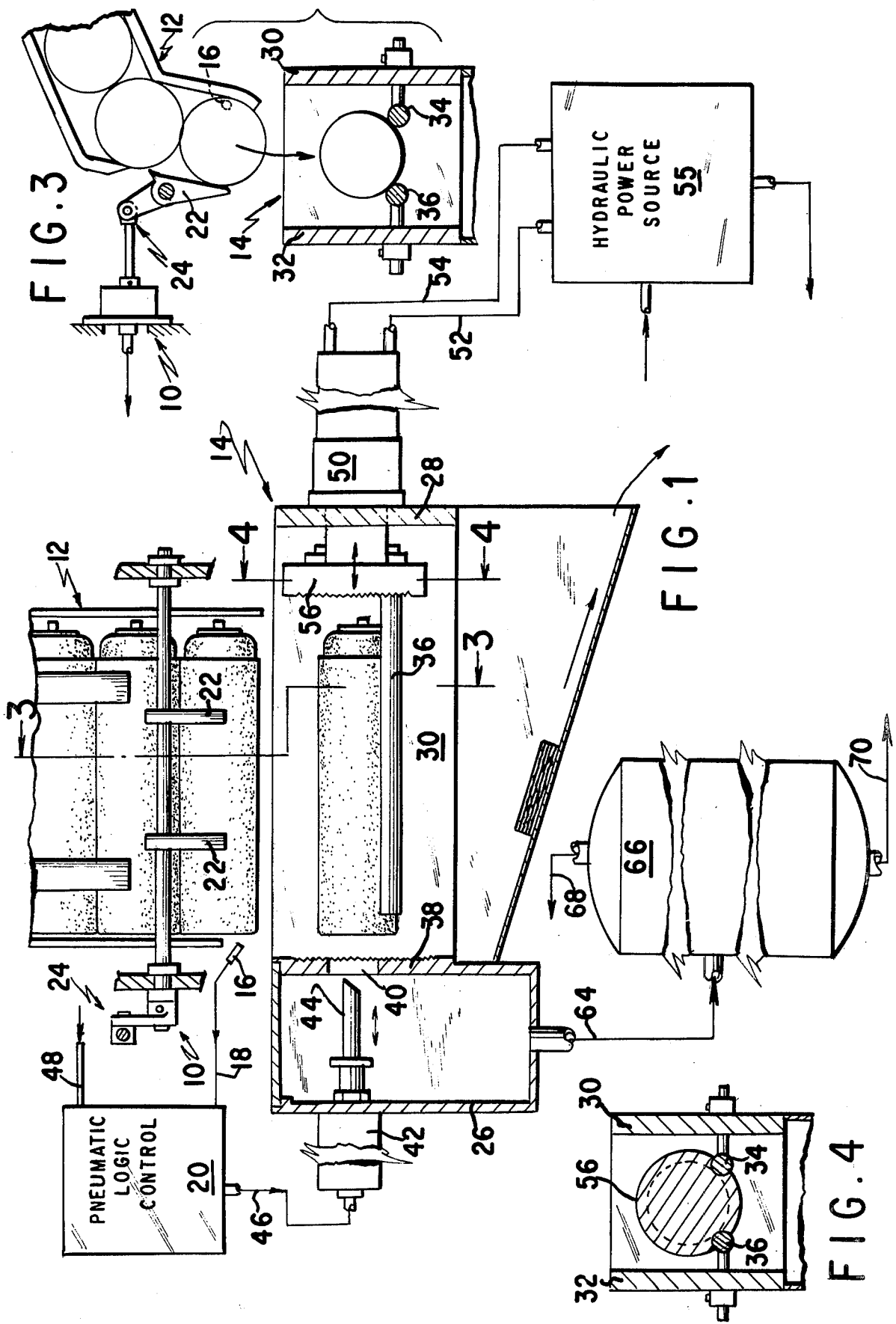
FIG. 1 is a flow sheet showing the relation of parts of the invention and includes a cross-sectional view of the feeder and crusher apparatus.

Filled aerosol cans for recovery are manually loaded into an inclined feed chute 12 and roll by gravity into a feed mechanism 10 which in one embodiment may be an air actuated pawl. Once in this position, a can's bottom edge will interrupt a feed air sensor 16, thus transmitting an air signal through a conduit 18 to a logic system 20 to initiate the feed mechanism 10. The feed air sensor 16 is a compressed air line situated diagonally to the end of the can. Air flow is interrupted (causing a sensible back pressure) by the bottom end of a properly oriented can, but is not interrupted by an improperly oriented can because the air stream will pass the valve end of the can. If the can is not placed in the chute properly, the feed air sensor 16 will not allow the can to be accepted into the crushing chamber. If necessary, cans are manually reoriented. This is necessary because the piercing of the bottom of the can is more effective than that of the valve end. Upon actuation of the feed mechanism 10, the crushing compartment feed pawl 22 is opened by means of a mechanical linkage 24 allowing the can to roll into the crushing chamber 14.

Figure 2:
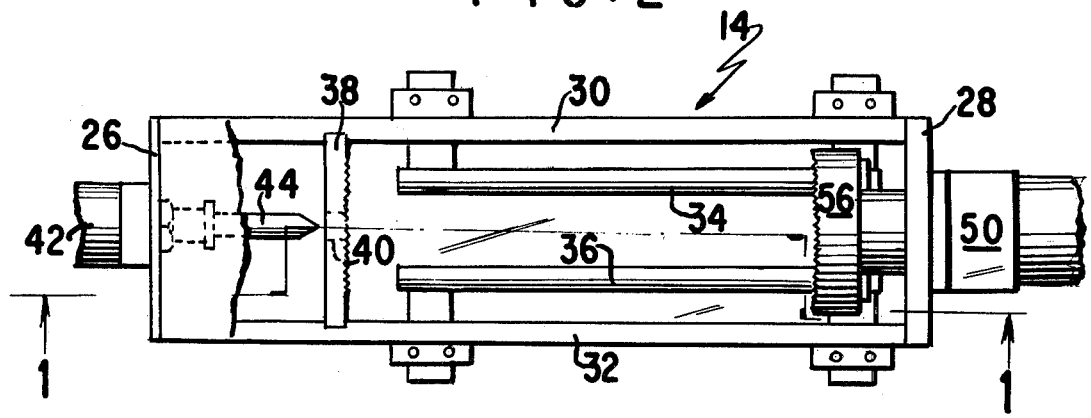
FIG. 2 is a top view of the crusher chamber of the invention.

As may be seen in FIGS. 1 and 2, the crushing chamber 14 is made up of first and second end plates 26, 28 and first and second side plates 30, 32. First and second rails 34, 36 are supported from the side plates 30, 32, respectively. A stator plate 38 is also supported between the side plates in fixed relation to the ends of the rails 34, 36 so as to allow a space through which crushed cans may drop. The stator plate is provided with an orifice 40. An air cylinder 42 is mounted on first end plate 26 and has a reciprocable piston to which is connected a piercing tip 44. The piercing tip 44 reciprocates through the orifice 40 in the stator plate 38 upon activation of the air cylinder 42 through conduit 46 by logic system 20, which is connected to a source of compressed air (not shown) by conduit 48.

A hydraulic cylinder 50 is connected to end plate 28 and may be actuated through hydraulic lines 52, 54.

Upon entering the crushing chamber 14, the can centers itself upon the two stabilizer rails 34, 36. The rails serve a two-fold purpose: first they serve to stabilize the compacting ram as it becomes extended, thus keeping the ram from raising up or shifting to the side upon compaction of the can. Secondly, they serve to support and align the can in the proper crushing position.

The can is allowed a predetermined interval of time to pass from the feed mechanism to the crushing position before the crushing cycle is initiated. This interval is accomplished by means of a pneumatic timer within the logic system 20.

Figure 5A:
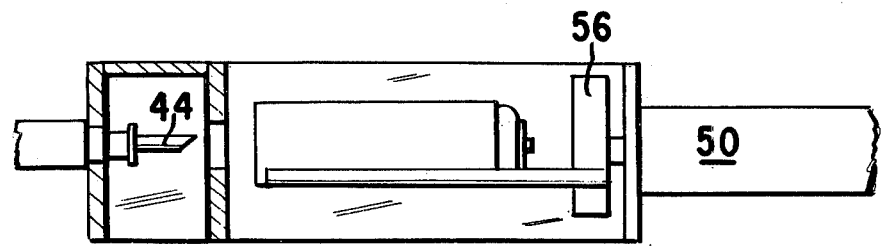
FIGS. 5A–5E are views of the sequential steps of the operation of the crushing chamber.
Figure 5B:
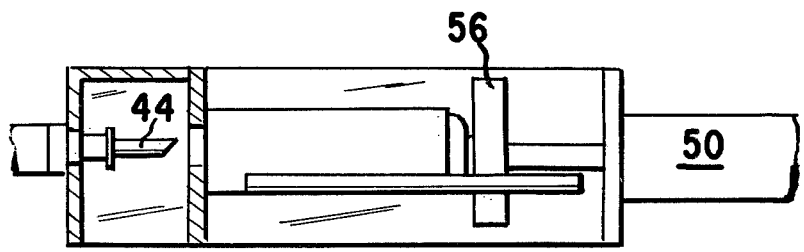
Figure 5C:
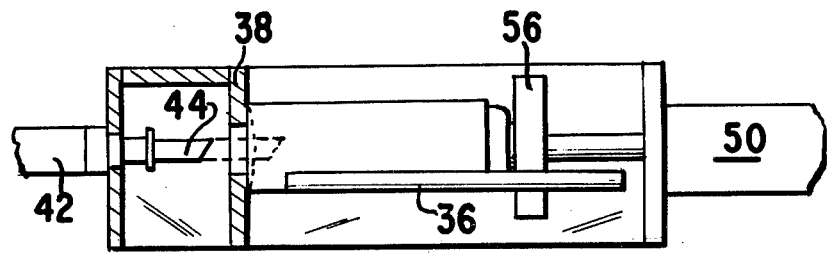
Figure 5D:
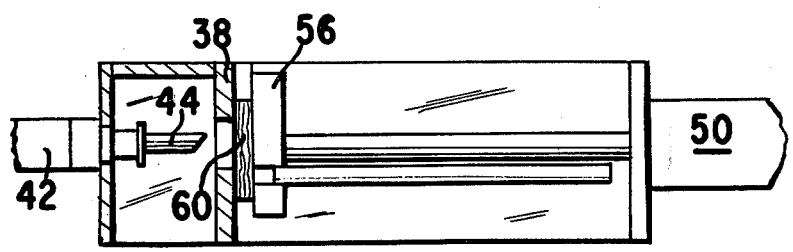

Upon completion of the time interval, the air logic system provides an air flow to a pneumatically powered hydraulic pump 55. The hydraulic system allows for a two-stage operation of the ram 56. The first stage supplies only enough hydraulic pressure to allow the ram 56 to make contact with the can and to hold it rigidly against the stator plate 38. The position of the can as it enters the crusher chamber is shown in FIG. 5A. The ram, at its first stage, pushes the can to the position shown in FIG. 5B. This enables the piercing tip 44 to puncture the can without movement upon impact as is shown in FIG. 5C. Upon completion of the piercing operation, the second stage of the hydraulic system provides sufficient pressure for the ram to complete the compaction stroke as is shown in FIG. 5D, thus crushing the can. All phases of the operation of this unit are governed by its ability to sense the predetermined pressures applied, so the compactor will self-adjust to all can lengths and diameters.

Figure 5E:
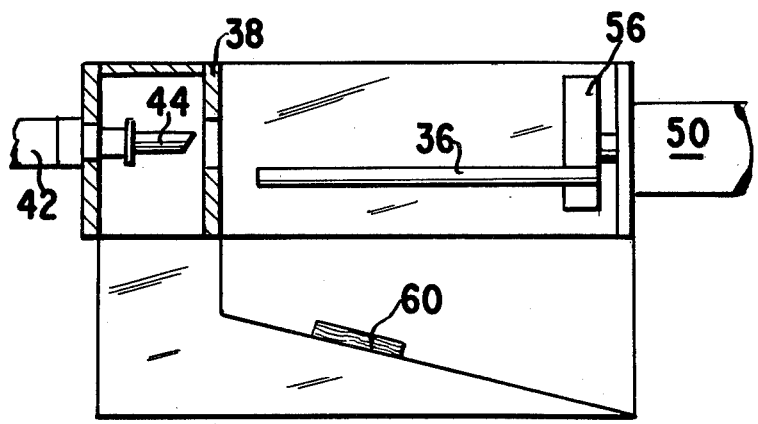

Upon full compaction of the can, the ram 56 is retracted allowing the crushed can 60 to fall by gravity between the ends of the stabilizer rails 34, 36 and the stator plate 38, and into accumulating container (not shown). The crushed can occupies about three percent of the volume of an intact. Thus the crusher compacts about thirty to one, greatly easing the disposal problem. As the ram becomes fully retracted, the air logic system automatically resets all functions to the "ready" position of FIG. 5E. If a can is present within the feed chute, the entire cycle will once again be repeated, but if not, the system will come to a standstill until the next can is received. It should be noted that this unit is completely air powered making it safe for operation within explosion-proof areas.

The contents of the container are discharged through conduit 64 into an accumulator tank 66. If desired, the vaporized propellant may be recovered through conduit 68. The liquid product is recovered through conduit 70.

What is claimed is:

1. Apparatus for evacuating and compacting aerosol cans comprising:
    A. a feed chute;
    B. means connected to said feed chute to sense the orientation of a can and to feed properly oriented cans;
    C. a crushing mechanism connected to receive the cans from said feed chute;
    D. a hydraulic ram connected to said crushing mechanism and adapted to move to a first position where a can is evacuated and to a second position whereby a can is compacted;
    E. a puncturing means reciprocably connected to said crushing mechanism whereby in a first position a can may be loaded or removed and in a second position a can is punctured;
    F. air logic means connected to said feed chute, sensing means, hydraulic ram and puncturing means to control the sequence of operation; and
    G. means connected to said crushing mechanism to receive the contents evacuated from a can when punctured.

2. In apparatus for evacuating and compacting aerosol containers having feeding, positioning, compaction and recovery means, the improved crushing chamber comprising:
    A. first and second end plates;
    B. first and second side plates connected to said end plates;
    C. first and second rails connected to said side plates and adapted to support an aerosol container;
    D. a stator plate connected to said side plates spaced apart from the end of said rails and having an orifice through it;
    E. an air cylinder connected to said first end plate and having a reciprocable piston;
    F. a piercing tip connected to said piston so as to be clear of said stator plate in a first position and to extend through said orifice in said stator plate in a second position;
    G. a hydraulic cylinder connected to said second end plate and having a reciprocable piston;
    H. a ram plate connected to said hydraulic cylinder piston so as
        1. to provide room for a container on said rails in a first position;
        2. to hold a container against said stator plate in a second position while said piercing tip moves from a first to a second position whereby the container is punctured;
        3. to crush a container when moving from said second position to a third position; and
        4. to release a crushed container when returning to said first position whereby the crushed container falls out of said chamber.

* * * * *